United States Patent [19]

McClurg

[11] 4,157,170

[45] Jun. 5, 1979

[54] GROOVE MOUNTED RESILIENT VALVE SEAT HAVING DEFORMABLE LIP

[75] Inventor: William E. McClurg, Stafford, Tex.

[73] Assignee: ACF Industries, Incorporated, New York, N.Y.

[21] Appl. No.: 864,407

[22] Filed: Dec. 27, 1977

Related U.S. Application Data

[63] Continuation of Ser. No. 693,467, Jun. 7, 1976, abandoned.

[51] Int. Cl.² .............................................. F16K 5/06
[52] U.S. Cl. .................................................... 251/315
[58] Field of Search ........................................ 251/315

[56] References Cited

U.S. PATENT DOCUMENTS

| 2,945,666 | 7/1960 | Freeman et al. | 251/315 |
| 3,146,988 | 9/1964 | Riopelle et al. | 251/315 |
| 3,193,248 | 7/1965 | Lowrey | 251/315 |
| 3,226,080 | 12/1965 | Lowrey | 251/315 |
| 3,269,693 | 8/1966 | Gulick | 251/315 |
| 3,288,430 | 11/1966 | Priese | 251/315 |
| 3,460,802 | 8/1969 | Colby et al. | 251/315 |
| 3,503,415 | 3/1970 | De Angelis et al. | 251/315 |
| 3,656,711 | 4/1972 | Toelke | 251/315 |
| 3,667,727 | 6/1972 | Bowden | 251/315 |

Primary Examiner—William R. Cline
Assistant Examiner—H. Jay Spiegel
Attorney, Agent, or Firm—Eugene N. Riddle

[57] ABSTRACT

A valve has an annular seat member coaxially mounted in a groove in the valve body around the outlet passageway. The groove has parallel sides which are perpendicular to its bottom. The seat member has a lesser radial thickness than the groove and is mounted in the groove in an uncompressed condition with substantial clearance between the sides of the seat member and the adjacent sides of the groove. A lip about the outer face of the seat member adjacent its inner periphery normally contacts the adjacent valve member in sealing relation. The portion of the seat member which fits within the groove has an inclined inner annular portion that does not contact the groove bottom and an outer resting surface which contacts the groove bottom. The seat member is formed of a deformable material with the lip being deformed when the seat member is loaded in compression as the valve is assembled. Upon loading the seat member it pivots about an outer corner located at an outer peripheral portion of the annular resting surface portion and it deforms a limited amount so sides thereof contact adjacent sides of the groove.

1 Claim, 9 Drawing Figures

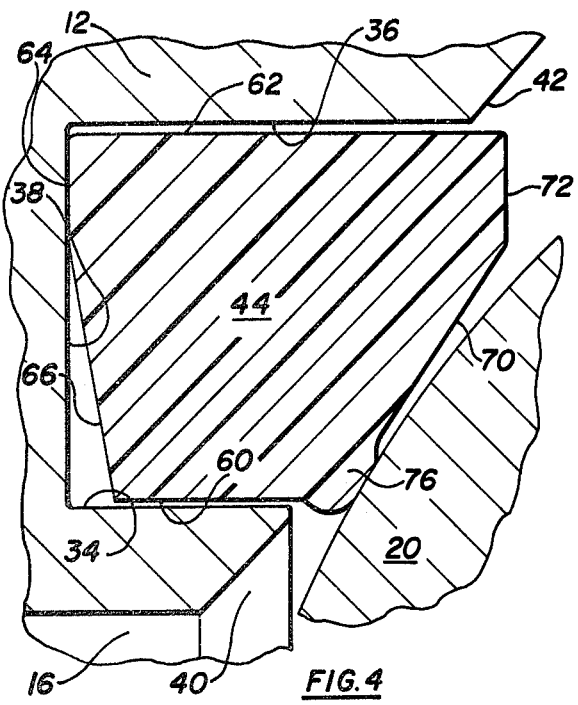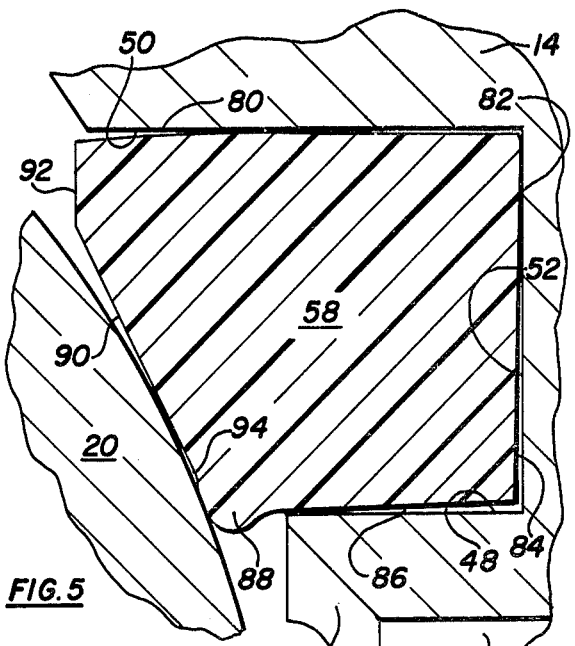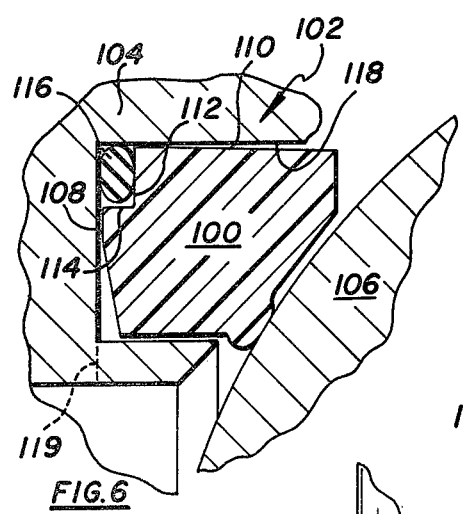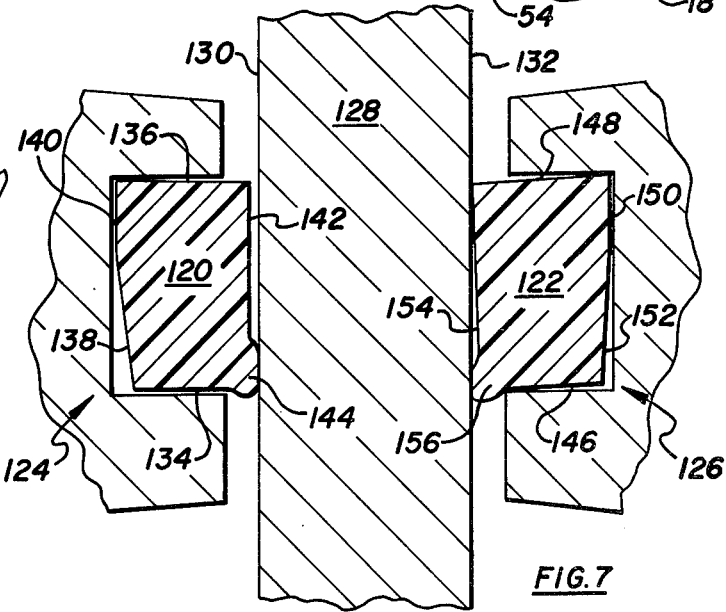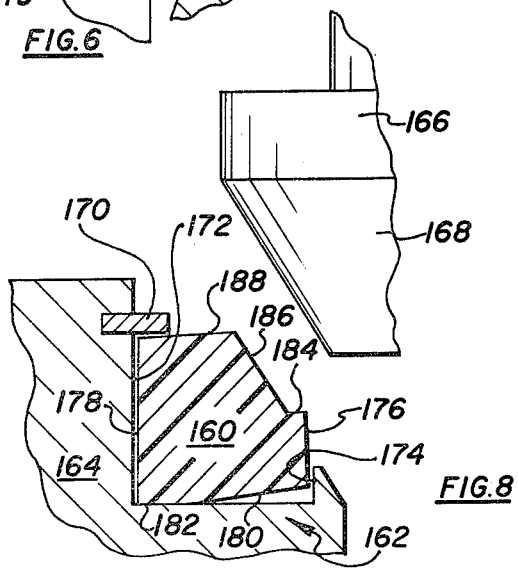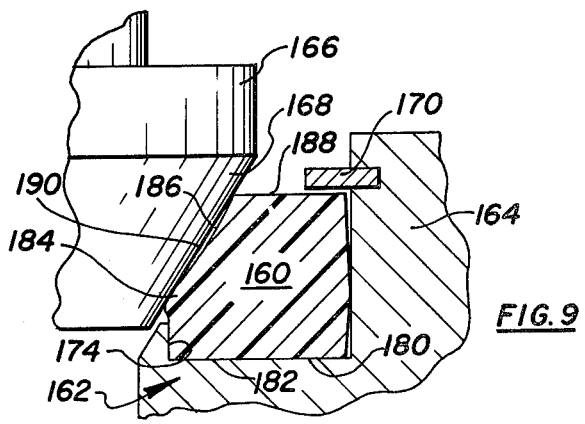

GROOVE MOUNTED RESILIENT VALVE SEAT HAVING DEFORMABLE LIP

This is a continuation of application Ser. No. 693,467, filed June 7, 1976 now abandoned.

BACKGROUND OF THE INVENTION

This invention is related to resilient valve seats for ball valves, gate valves, etc., wherein the seat member is deformed by the valve member upon assembly of the valve and it is additionally resiliently deformed during pressure loaded conditions to insure positive sealing. To be more specific, this invention relates to valve seats which in a preloaded condition maintain a relatively small surface contact with the valve member and in a pressure loaded condition the downstream seat member in a valve has a substantially larger contact surface area.

In many prior art valve constructions, the seat members are placed under a load which establishes the initial seal for the valve by placing the seat member in substantially a full seat surface contact with portions of the valve body and the valve member(s) so that initial loading and further pressure loading of the valve seat member(s) additionally compressibly load the seat members. In such typical valve constructions where the seat member is restrained a substantial interference develops between the seat member and the valve member with the resultant force acting against the valve member and requiring high forces to move the valve member on the seat member in either opening or closing the valve. Additionally, it is to be noted that because these typical prior art seat construction maintain a generally full surface seat contact, the resultant interference forces are at least a minimum when the valve is open and the seat members are only under the influence of preloading forces. These prior constructions are particularly unsatisfactory because relatively high forces are created by the full seat contact surfaces and thus large forces are always required to move the valve member.

SUMMARY OF THE INVENTION

Generally speaking, the seat structure of this invention is similar for all embodiments disclosed herein. Briefly, the valve body is provided with an annular groove opening to the valve chamber in axial alignment with the outlet passageway and the groove has substantially parallel inner and outer sides with the bottom thereof perpendicular to the sides. The annular seat member has a lesser radial thickness than the groove and is mounted in the groove in an uncompressed condition with substantial clearance between sides of the seat member and sides of the groove. The seat member extends beyond the groove into the valve chamber terminating at an outer seat face and having an annular lip around the seat member opening on the outer seat surface. The seat member is constructed of a deformable material so the annular lip is deformed when the seat member is loaded in compression by the valve member as the valve is assembled. In an additional embodiment of the seat member, the portion which fits into the groove has an inclined inner annular bottom portion that initially does not contact the groove bottom and an outer annular resting surface portion that contacts the groove bottom. The inclined inner annular bottom portion is divergent from the groove bottom beginning at the innermost portion of the annular resting surface. During assembly of a valve using this seat construction, the seat member is resiliently deformed and pivotable about an outer portion of the annular resting surface with the lip also being deformed. For both constructions under compressive pressure loading of the valve member the seat member is loaded to resiliently expand so sides thereof contact sides of the groove to limit deformation of the seat member.

One object of this invention is to provide a valve seat structure overcoming the disadvantages of the prior art devices described above.

Still, one other object of this invention is to provide a valve seat structure which has a relatively low operating torque and which will effect a fluid tight seal at both high and low pressures.

Another object of this invention is to provide a seat member constructed of a resilient and elastic material, with a permanently deformable lip portion on the sealing surface thereof, and which is torsionally elastically deformable in the seat pocket groove.

Yet, another object of this invention is to provide a valve seat having a lower operating torque than comparable size conventional seats.

Still, one further object of this invention is to provide a seat construction which is useable in ball valves, gate valves, and globe valves as well as other valve structures wherein a lip portion is provided on an inner annular portion of the resilient seat structure for contacting the valve member in an non-pressure loaded or slightly pressure loaded condition with the seat member including the lip being further deformable upon increased pressure loading to seal in a greater surface area both between the seat and the valve member and between the seat member and the valve body by virtue of annular rotational motion of the seat in the groove.

Various other objects, advantages, and features of this invention will become apparent to those skilled in the art from the following discussion, taken in conjunction with the accompanying drawings, in which:

DESCRIPTION OF THE DRAWINGS

FIGS. 4 and 5 are enlarged cross-sectional views of the respective upstream and downstream seat members and adjoining grooves and portions of the ball member for the ball member for the ball valve shown in FIG. 1 with the valve in a closed position and pressure loaded condition;

FIG. 6 is a cross-sectional view of another embodiment of the seat member shown in a seat groove and adapted for a ball valve wherein a peripheral groove is provided in the seat ring member for mounting an O-ring;

FIG. 7 is a cross-sectional view of another embodiment of this invention illustrating both upstream and downstream seats and a portion of the gate for a gate valve employing the seat construction of this invention;

FIGS. 8 and 9 illustrate another embodiment of the seat member showing a globe valve body and globe therefor and employing the seat construction of this invention with the valve being shown in an open position and closed position, respectively.

Figure 1:
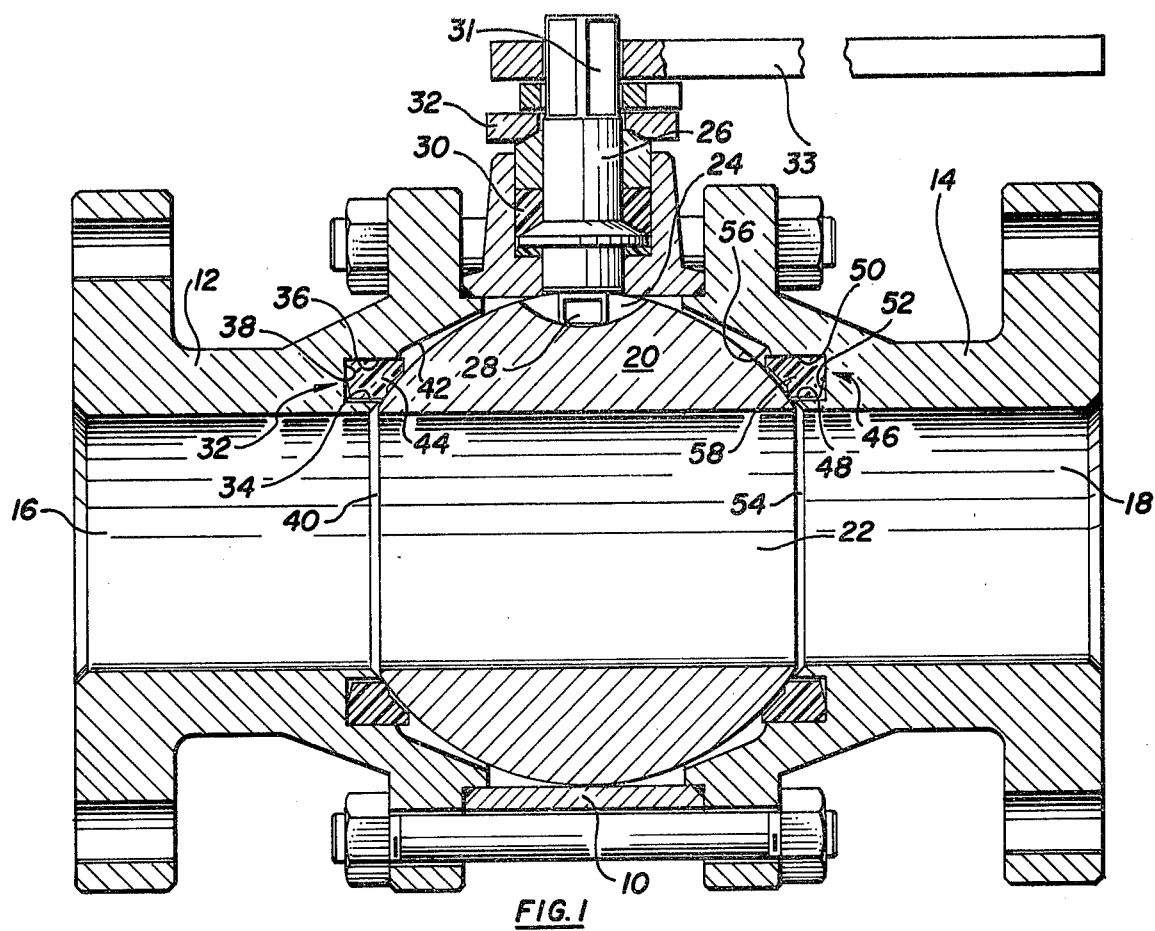
FIG. 1 is a cutaway view of a floating ball type ball valve employing the seat construction of this invention with portions thereof shown in full view for clarity and being in an open position illustrating the assembled and non-loaded position of the ball member and the seat members.

The following is a discussion and description of specific embodiments of the structure of this invention with such being made with reference to the drawings, whereupon the same reference numerals are used to indicate the same or similar parts and/or structure. It is to be understood that such discussion and description is not to unduly limit the scope of the invention.

DETAILED DESCRIPTION

FIG. 1 shows a ball valve generally comprised of a valve body having inlet and outlet flow passageways, enclosing a ball valve member and a pair of annular seat members and having a stem to rotate the ball valve member. The valve body is formed of a central annular housing 10 and the two hollow annular end members 12 and 14 having inlet and outlet passageways 16 and 18 therethrough respectively. The end members 12 and 14 are disengageably mounted to annular housing 10. Annular housing 10 has a bore therethrough which forms a portion of the valve chamber and which contains the ball valve member 20. Ball valve member 20 is provided with a bore 22 therethrough which is alignable with inlet and outlet passageways 16 and 18 to form the run of the valve. The axis of bore 22 is preferably concentric with the axis of the inlet and outlet passageways 16 and 18 when ball member 20 is in the open position. Ball member bore 22 can have the same cross-sectional area as the inlet and outlet passageways 16 and 18 or if desired, it may be smaller or larger or specially shaped providing a venturi design as is well-known in the art.

In order to rotate ball member 20 a notch 24 is provided in one side thereof for connecting with a stem 26 which is rotatably mounted through central annular housing 10. Stem 26 has a cylindrical mid portion and a noncylindrical, preferably rectangular tongue portion 28 on its innermost end engaged with notch 24. A stem seal 30 and seal retainer 32 are provided for fluid sealing around stem 26 with seal retainer 32 being secured to body central annular housing 10. Stem 26 is shown with a noncylindrical outer end 31 and a wrench or handle mounted thereon for turning the stem.

Valve body end members 16 and 18 are shown in FIG. 1 as being mounted by bolts on central housing 10, however it is to be understood that the housing end members 12 and 14 can be threadedly mounted, if desired. As is well-known in the art, an alternative construction for this valve body is with only one end member removable or with only one seat ring support assembly being removable. Regardless of the specific construction, the valve structure must have grooved seat pockets for supporting the seat members in relation to ball member 20. Referring to the specific construction shown in FIG. 1, valve body end member 12 has an annular seat groove, indicated generally at 32, around inlet passageways 16. Groove 32 has substantially parallel inner and outer annular side walls 34 and 36 with bottom 38 being substantially perpendicular to the side walls. Groove 32 opens into the valve chamber with groove side wall 34 joining a frusto-conically shaped surface 40 around the inner end of inlet passageway 16. Frusto-conical surface 40 is divergent from passageway 16. Outer groove side wall 36 joins valve chamber inside surface 42. Surface 42 is oriented such that ball member 20 will not contact surface 42 if ball member 20 contacts frusto-conical surface 40. The upstream seat member 44 is mounted in groove 32 and extends into the valve chamber beyond surfaces 40 and 42 contacting the spherical exterior surface of the ball member 20. Tailpiece or downstream end member 14 is provided with a seat groove, indicated generally at 46 having parallel inner and outer side walls and 48 and 50 and with the groove bottom 52 substantially perpendicular to the side walls. Groove inner side walls 48 joins inner frusto-conical surface 54 which in turn, connects with the interior surface of outlet passageway 18. Outer groove side wall 50 joins the inside surface 56 of end member 14. Surface 56 is oriented such that ball member 20 will not contact surface 56 if ball member 20 contacts frusto-conical surface 54. Downstream seat member 58 is mounted in groove 46 and extends into the valve chamber beyond frusto-conical surfaces 54 and 56 to contact the spherical exterior surface of valve member 20.

Figures 2, 3:
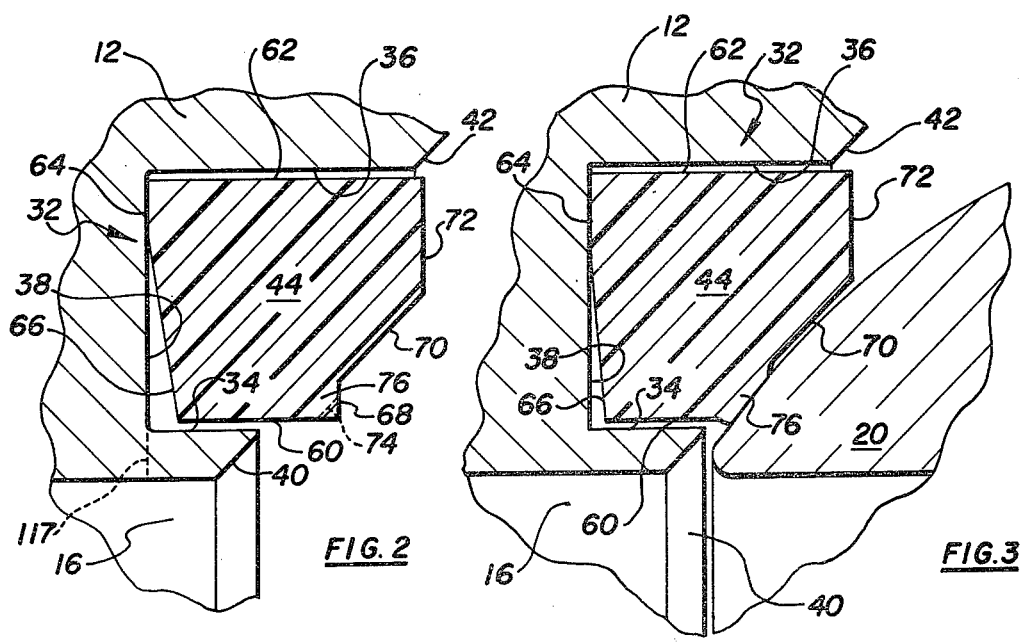
FIG. 2 is an enlarged cross-sectional view of the valve body groove area and a seat ring member alone with the seat ring member shown in its free position in the groove prior to assembly of the valve.
FIG. 3 is an enlarged cross-sectional view of a seat member and adjoining portions of the valve body and ball member for the valve illustrated in FIG. 1 with the valve member in an open position and a preloaded condition.

FIG. 2 shows upstream seat member 44 in groove 32 in the position it assumes when it is placed in the groove during assembly of the valve and prior to bringing it into contact with the ball member. Seat members 44 and 58 are identical for the ball described herein. For the purposes of brevity, only construction of the upstream seat member 44 will be described in detail. FIG. 2 shows seat member 44 in its original form in an unrestrained condition. Seat member 44 has concentric parallel inner and outer sides 60 and 62 respectively. The bottom portion of seat member 44 which resides in the bottom of the seat groove has an outer annular resting surface portion 64 around the perimeter thereof which extends radially inward from outer side 62 to a midpoint where surface 62 intersects an inclined inner annular bottom portion 66. Inclined annular bottom portion 66, shown clearly in FIG. 2, is divergent from groove bottom 38 toward the inner annular portion of seat member 44. With the seat member in both the free and preloaded positions, seat member sides 60 and 62 can be spaced substantially from groove sides 34 and 36 respectively as shown. In some situations sizing of the parts may be such that compression of seat member 44 by preloading may place sides of the groove and seat member in contact. Inner seat member side 60 extends inward beyond groove side wall 34 to a point which will lie inside the valve chamber. At its innermost corner, portion seat inner side 60 joins a transversely disposed and essentially flat seat contact surface side 68. An inclined substantially frusto-conically shaped seat contact surface 70 intersects transverse surface 68 and extends radially outward therefrom and away from the opposite side of seat member 44. Another outer peripheral portion of this side of seat member 44 is defined by a transversely disposed inner annular surface 72. Inner annular surface 72 joins seat member outer side 62 at an inner peripheral corner of the seat member. Seat member 44 can be constructed with its inner annular corner at the juncture of sides 60 and 68 being chamfered as shown by dashed lines 74 or it can be shaped in a smoothly curved form if desired. This specific shape of inner annular corner portion can be modified as desired depending upon the material of construction for the seat member as is necessary or desirable to prevent or regulate deformation of the lip. It is to be emphasized that seat member 44 rests only on the outer annular resting surface portion 64 when it is placed in the groove in an unloaded condition, such as in the process of assembling the valve. Later when the valve is completely assembled, inclined bottom portion 66 will be closer to and can contact groove bottom 38.

FIG. 3 shows seat member 44 in groove 32 and with ball member 20 in contact therewith in a preloaded condition which is the condition of the valve when assembled and placed in either the open position or a closed position with no upstream or downstream pressure on the ball member. Upon assembly of the valve, the lip portion of seat member 44 is deformed to the position shown in FIG. 3. Upon preloading seat member 44 the inclined annular bottom portion 66 is displaced toward groove bottom 38. This pressure loading rotates seat member 44 about its cross-sectional center of rotation slightly as well as deforms to the position and a form as shown in FIG. 3. Lip 76 is deformed so its exterior surface conforms to the exterior spherical surface of ball member 20 as well as any significant imperfections or deviations in the spherical surface which contact with lip 76. Inclined surface 70 in this condition is spaced a small distance from the exterior surface of ball member 20 and the seat member inner and outer sides 60 and 62 are spaced from the groove side walls 34 and 36. FIG. 3 shows ball member 20 in an open position and in a no line pressure condition. In this no line pressure condition rotation of the ball member will not significantly effect the position or shape of seat member 44. The selection of lip 76 with a sharp corner portion or a corner portion of some other shape depends upon the amount of deformation which the material of seat member 44 can stand without crushing or losing its elasticity. Preferably lip 76 is deformed by the preloading to an extent which will cause it to retain some permanent deformation so that its ball contact surface will substantially conform to the spherical surface shape of ball member 20. Because seat member 44 is resilient it can be further deformed upon pressure loading of the valve and upon release of the pressure loading seat member 44 will return to its permanently deformed position or form.

Operation of the ball valve seat of this invention is illustrated in FIGS. 3, 4 and 5. FIGS. 4 and 5 taken together show seat members 44 and 58 in their respective seat pockets with ball member 20 in a side-by-side view. In FIGS. 4 and 5 the valve is depicted in a closed position with the ball member being in the pressure loaded condition. With the valve in this condition, ball member 20 is displaced in the downstream direction which additionally compressively loads downstream seat member 58 and reduces the forces on upstream seat member 44. In FIG. 4, lip 76 remains in contact with the spherical surface of ball member 20 and because ball member 20 is displaced downstream from its original preloaded position as shown in FIG. 3 and the gap between groove bottom 38 and inclined surface 66 is increased. Spacing between upstream seat member sides 60 and 62 and upstream groove sides 34 and 36 remain somewhat as before in that the sides do not touch. FIG. 5 illustrates seat 58 in the pressure loaded condition wherein seat member outer side 80 is spaced from groove outer side 50 on all but the innermost portion of the groove side which can contact upon extreme pressure loading of the seat. In the bottom of groove 46 the downstream seat outer annular resting surface 82 is in full contact with groove bottom 52 and the inclined inner annular bottom portion 84 is slightly spaced from groove bottom 52. It is to be noted that the inclined inner annular bottom portion 84 can be in contact with groove bottom 52 upon extreme loading of seat member 58. Seat member inner annular side 86 is spaced from groove inner side wall 48 near groove bottom 52 and contacts the groove side wall at a point distant from groove bottom 52 along its outer portion adjacent the opening of the groove. Downstream seat member lip 88 in the pressure loaded condition is compressed to a further extent than it is in the preload condition. The spherical surface of ball member 20 contacts downstream outer seat surface 90 at a point between lip 88 and the extreme outer end 92 of the seat. In the position shown in FIG. 5, a small gap indicated at 94, is present between lip 88, ball member 20 and its juncture with outer seat surface 90. Upon further pressure loading of ball member 20 and downstream seat 58 the ball member and seat gap 94 is reduced and in the extreme condition this gap is not present.

With ball member 20 in the closed and pressure loaded condition as shown in FIGS. 4 and 5, the upstream pressure in passageway 16 is greater than the pressure in the downstream passageway 18. Upstream pressure is applied to the surface of ball member 20 on an area defined by the inner portion of upstream lip 76 plus the area of inclined surface 66 in the bottom of groove 32. Fluid pressure in the valve body of valve chamber can be equal to upstream line pressure when seat member 44 is displaced downstream sufficiently to allow fluid communication between groove bottom 38 and outer annular seat resting surface 64. In this event upstream fluid pressure in the valve body acts on seat member 58 around the outer peripheral portion by fluid entering the space between seat outer side 80 and downstream groove outer side wall 50. This tends to rotate downstream seat member 58 counterclockwise, when seen in the position of FIG. 5, and thus further increase the sealing pressure on the sealing surfaces between ball member 20 and seat member 58. Upon pressure loading of downstream seat member 58 hoop stresses are induced in the seat member which cause it to expand radially both inwardly and outwardly thus bringing portions thereof into contact with groove walls 48 and 50 as illustrated. Groove sidewalls 48 and 50 function to limit lateral expansion of seat member 58. In regard to rotating motion of the seats when pressure loading occurs, upstream seat member 44 is rotated counterclockwise from the position as viewed in FIG. 3 to the position shown in FIG. 4 due to the pressure on sides 60 and 66. The effect of this rotating motion on upstream seat member 44 is to urge lip 76 in contact with ball member 20 as the ball member is displaced downstream .

With the valve in the closed position as shown in FIGS. 4 and 5 and with the body pressure greater than the upstream pressure then the novel valve seat construction of this invention can release the body pressure by communicating fluid to the upstream side of the ball member. If the body pressure is above the upstream pressure by a significant amount seat member 44 is rotated clockwise in groove 32 thereby releasing the seal between lip 76 and ball member 20 thus bleeding or reducing the body pressure to a level substantially the same as the upstream pressure while at the same time maintaining the downstream seal. Forces tending to rotate seat member 44 clockwise are created by fluid pressure between seat side 70 and ball member 20 combined with pressure between seat outer side 62 and groove outer side 36 overcoming forces between seat sides 60 and 66 and groove sides 34 and 38. It is to be noted that if desired the body pressure can be bled externally by providing an auxillary outlet in the valve body communicably connected with the valve chamber between the seat members. When body pressure is bled this will increase the differential forces acting on upstream seat member 44 provided the upstream pressure is higher than the pressure in the valve chamber at the time of the bleeding. Upon rotating ball member 20 to the open position as soon as the ball member bore 22 passes lips 76 and 88 upstream fluid pressure is communicated to the downstream passageway 18 and to the valve chamber which releases the pressures acting on the seat members. Relieving these pressures allows valve member 20 to move upstream and return to the preloaded position. One important feature of the novel seat construction of this invention when used on ball valves is its relatively low operating torque. The unique lip construction of the seat members provides a relatively small contact surface area between the seat members and the ball. In the preloaded condition only preload forces are on the ball and seat members and only these must be overcome to close the valve. One factor contributing to the low operating torque is the seat lips being close to the internal diameter of the seat members. Another factor contributing to the low operating torque is the fact that the seats are self energized structures and change shape upon increased loading to provide a greater seat contact surface on the ball member. The greater seat contact area is present only in a pressure loaded condition and this can be only a substantially two point contact as described above.

FIG. 6 illustrates an additional embodiment of the seat construction of this invention wherein a seat member 100 is mounted in a groove, indicated generally at 102, in a valve body 104 and in contact with a ball member 106. Seat member 100 is shaped substantially the same as the seat members described above with only one exception, therefore, only the different portion of the structure will be described herein for brevity. Seat member 100 is provided with a groove in its outer peripheral portion at the juncture of the outer annular resting surface 108 and the seat members outer peripheral side 110. The groove is provided with a radially disposed side 112 and an axially or longitudinally disposed side 114. An O-ring 116 is mounted in the confined spaced defined by the groove and the bottom corner of groove 102. O-ring 116 functionally provides for sealing between seat member 100 and groove 102 around the outer perimeter thereof as seat member 100 rotates cross-sectionally and moves upstream and downstream in normal operation of the valve. When the valve is in closed position and the upstream pressure is higher than the body pressure then O-ring 116 is urged toward the right from the position shown in FIG. 6, whereupon a seal is maintained between the outer peripheral groove side 118 and seat groove side 112. In the event the body pressure is higher than the upstream pressure, O-ring 116 is subjected to pressure through the space between the seat ring outer side 110 and groove outer side 118 thereby forcing it toward the groove bottom and sealing between the groove bottom 108, groove side 118 and seat ring groove side 114. It is to be understood that this embodiment of the seat construction of this invention can be employed as either the upstream or the downstream seat or both, as desired.

FIGS. 2 and 6 also illustrate a second embodiment of the valve seat groove construction. This second embodiment of the groove construction is basically a non-pocketed groove wherein the groove is defined by longitudinally oriented side and the radially disposed side including the portion shown in dashed lines and indicated at 117 in FIG. 2 and 119 in FIG. 6. In FIG. 2, the groove is defined by longitudinal side 36 and radially disposed side 38 including the portion shown in dashed lines 117. In FIG. 6, the groove is defined by longitudinal side 118 and radially disposed side 108 including the portion shown in dashed lines 119. It is to be noted that the seat ring as shown in FIG. 2 or FIG. 6 can be used in a non-pocketed seat ring groove. By placing the novel seat ring of this invention in a non-pocketed groove if functions substantially the same as it does in a pocketed groove except in the case of the downstream seat ring when loaded in compression this seat ring will not be retained on the annulus portion thereof and because the seat ring is not retained internally it can be deformed inwardly relative to the valve bore. This deformation poses no particular distinction in regard to operation of the seat ring from that described above except that for selected seat ring materials after a considerable period of use the seat ring can be sufficiently inwardly deformed such that the seat ring annulus can, in some loading conditions, be cut or clipped by the ball member as the juncture of the bore and the spherical surface passes the deformed portion as on closing the valve.

FIG. 7 illustrates the seat construction of this invention used in a gate valve. In the portion of the gate valve illustrated in FIG. 7, a pair of seat members 120 and 122 are shown positioned in grooves 124 and 126 respectively, located in opposing portions of a gate valve body with the valve chamber therebetween. A gate 128 is shown positioned between seat members 120 and 122 and in contact therewith. For purposes of illustration, seat member 120 can be thought of as being on the upstream side of the valve. Gate 128 preferably has parallel upstream and downstream side surfaces 130 and 132 respectively. FIG. 7 shows the gate valve in a closed position and a presssure loaded condition with gate 128 displaced downstream. Upstream seat member 120 has an annular inner side surface 134 and a cylindrical outside surface 136, an inclined outer side surface 138, an annular bottom outside resting surface 140, an inner surface contact side 142, and a lip 144 around the inner annular portion of the member. Lip 144 is constructed similar to the lip described above in conjunction with the foregoing embodiments of this invention. Lip 144 is shown in FIG. 7 in its deformed position, however, it is to be understood that the original and free position of lip 144 can be substantially that of an annular protrusion concentric with a cross-sectionally triangular, hemispherical, arcuate or any other suitable shape which will deform to give a desired sealing effect. Seal ring inclined side surface 142 is constructed to be inclined relative to gate side surface 130 a slight amount so side surface 142 contacts gate side 130 on its outer annular portion first when it moves toward the gate member. The gate valve downstream seat member 122 is constructed similar to the upstream seat member with concentric inner and outer sides 146 and 148, a bottom resting surface 150, inclined surface 152, inner inclined sealing surface 154 and a lip 156. Upon motion of gate 128 in the downstream direction lip 156 and the outermost peripheral portion of inclined side surface 154 contact the gates downstream side 132 first with a small gap located between the side of the gate and inclined surface 154 on the area joining lip 156. In regard to sealing, motion of the seats and relative pressures in the upstream passageway in the valve, the downstream passageway, and the valve chamber are the same for this application of the seat construction as that described in detail above in conjunction with the ball valve application.

FIGS. 8 and 9 illustrate the seat construction of this invention as applied to a globe valve. A seat member 160 is shown mounted in a groove, indicated generally at 162, in a globe valve body 164. A globe valve member 166 is movably mounted in the globe valve in the valve chamber thereof and movable between open and closed positions. In the closed position globe member 166 contacts with seat member 160 as shown in FIG. 9. Globe valve member 156 has a frusto-conically shaped seat contact surface 168 which contacts seat member 160 when the valve is closed. Groove 162 is an open rectangular three sided groove similar to the grooves described previously, however, because of the unique single seat structure of a globe valve a valve seat retainer ring 170 is mounted in the outer groove side wall 172. Groove inner side wall 174 is significantly shorter in height than outer side wall 172 in order to accomodate the frusto-conical shaped globe valve member 166. Seat member 160 is shaped the same as the above described seat members in that they have an inner annular side wall 176, an outer side wall 178, an inclined bottom surface 180, a bottom resting surface 182, a lip 184, and an inclined seat contact surface 186. With the globe valve in the closed position, lip 184 is deformed somewhat as shown in FIG. 9 with frusto-conical valve member surface 168 contacting lip 184. With the outer edge portion of seat contact surface 186 resting on lip 184, there is a small gap 190 adjacent to lip 184. Functionally, seat member 160 operates as does the downstream seat in the above-described valve seat configurations with the exception that the preloaded position does not exist because globe member 166 is completely removed from the seat in open position. The free position of seat member 160 is shown in FIG. 8. Lip 184 is shown in FIG. 8 in its initial undeformed position. Lip 184 can be deformed substantially permanently after it is initially deformed by globe member 166 in the same manner as the lip portions of the above-described seat members.

In summary, the use and operation of all the embodiments of the valve seat structure of this invention all function generally similarly in that the lip portion thereof can be substantially permanently deformed upon assembly and during use of the valve. An important feature of the lip is that because it is placed so close to the internal diameter or inside diameter of the seat rings the operating force for a valve is significantly reduced below that of conventional seats because the surface area in contact with the valve member is smaller and pressures on the seal portion of the seat member at this area are less than they are further radially outward. Another important feature of this invention is the rotating motion of the seats which allows the line pressure to assist sealing and the body pressure to be bled from the valve chamber when the valve is closed.

In the manufacture of the seat members of the valves described herein, it is obvious that the seat members and the valve body structures can be easily constructed to achieve the end product. Basically, the valve seat structure and the valve body structure are therefore no more difficult to manufacture than many prior art valve constructions. The valve seat member can be constructed of any resilient material; for example, a plastic material such as polytetrafluoroethylene marketed by E. I. duPont E. Nemours & Co., Inc., under the trademark "Teflon" in a homogeneous configuration or with a filler depending upon the design requirements for a particular service. Also, the valve seat can be constructed of an elastomeric material.

In the use and operation of the valve of this invention including the unique and novel seat structure thereof it is seen that same provides a unique seat structure for ball valves, gate valves and globe valves which allows for compensation for the specific shape of the valve member contacting the seat and it provides a seat which has a relatively low operating torque. The valve of this invention is relatively economical to manufacture due to the simplicity of the shapes involved in the structure. A valve using this seat construction is easily repaired in the field because the seats drop in place in the seat grooves in the valve structure.

What is claimed is:
1. A ball valve comprising:
(a) a valve body having inlet and outlet passages and a valve chamber therebetween;
(b) a generally spherical ball valve member mounted in said valve chamber for movement between an open position and a closed position;
(c) upstream and downstream grooves of annular shape formed about the respective inlet and outlet passages, each groove opening to said valve chamber and defining substantially cylindrical inner and outer sides concentric with one another;
(d) a substantially flat bottom of each groove extending between said inner and outer sides in perpendicular relation thereto;
(e) upstream and downstream annular seat members in the respective upstream and downstream grooves for contacting the valve member, each seat member being resilient and having substantially cylindrical inner and outer sides concentric with one another and spaced from the corresponding sides of the associated groove when the seat member is in an uncompressed condition;
(f) a bottom of each seat member in the form of a substantially flat outer portion normally sealed against the bottom of the associated groove and a contiguous inclined portion intersecting said inner side of the seat member and normally spaced from the groove bottom;
(g) a substantially frusto-conical surface of each seat member facing the valve member;
(h) an annular lip of each seat member formed integrally therewith between said frusto-conical surface and inner side on a minimum diameter portion of the seat member and at a location spaced away from said inclined portion of the bottom of the seat member, each lip normally sealing against the valve member and being spaced closely from the inner side of the corresponding groove so that said inner side of each seat member is restrained by the inner side of the corresponding groove at a location closely adjacent said lip;
(i) said downstream seat member deforming when loaded in compression such that the sides thereof contact the corresponding sides of the downstream groove to thereby limit deformation of the downstream seat member, said frusto-conical surface of the downstream seat member sealing against the valve member when same is closed and subjected to line pressure forcing it toward the downstream seat member;

(j) said lip of the upstream seat member sealing against the valve member and said flat outer bottom portion of the upstream seat member sealing against the bottom of the upstream groove to provide the only contact of said upstream seat member with said valve body and said valve member when the latter is closed and subjected to line pressure; and (k) said upstream seat member presenting a greater surface area exposed to said valve chamber than to said inlet passage so that fluid pressure in said valve chamber in excess of fluid pressure in said inlet passage effects pivoting of said upstream seat member about its flat outer bottom portion in a direction to release the seal between its annular lip and said valve member, whereby the fluid in said valve chamber bleeds into the inlet passage.

* * * * *